(12) United States Patent
Honmi (10) Patent No.: US 7,728,842 B2
(45) Date of Patent: Jun. 1, 2010

(54) IMAGE FORMATION PROCESSING SIMULATION APPARATUS AND IMAGE FORMATION PROCESSING SIMULATION METHOD

(75) Inventor: Tetsuya Honmi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 802 days.

(21) Appl. No.: 11/481,845

(22) Filed: Jul. 7, 2006

(65) Prior Publication Data

US 2007/0188486 A1 Aug. 16, 2007

(30) Foreign Application Priority Data

Feb. 10, 2006 (JP) .............................. 2006-034534

(51) Int. Cl.
*G06F 12/02* (2006.01)
*G06F 13/00* (2006.01)
*G06T 1/60* (2006.01)

(52) U.S. Cl. ..................... 345/543; 345/530; 345/537

(58) Field of Classification Search ................. 345/419, 345/530, 537, 543; 358/1.16–1.17
See application file for complete search history.

(56) References Cited

U.S. PATENT DOCUMENTS

| 5,802,341 | A  | * | 9/1998  | Kline et al. ................. 711/209 |
| 6,181,435 | B1 | * | 1/2001  | Onodera .................... 358/1.14 |
| 6,449,058 | B1 | * | 9/2002  | Ueda ......................... 358/1.16 |
| 6,462,833 | B1 | * | 10/2002 | Claiborne ................. 358/1.16 |
| 6,486,968 | B2 |   | 11/2002 | Nishikawa |
| 6,538,764 | B2 | * | 3/2003  | Ueda ......................... 358/1.16 |
| 6,664,902 | B2 | * | 12/2003 | Andrew et al. ................ 341/50 |
| 6,701,420 | B1 | * | 3/2004  | Hamilton et al. ............. 711/170 |
| 6,717,693 | B2 |   | 4/2004  | Mitsuhashi et al. |
| 6,914,696 | B1 | * | 7/2005  | Kojima et al. ............... 358/1.16 |
| 7,271,926 | B2 | * | 9/2007  | Amemiya ................... 358/1.15 |
| 7,298,380 | B2 | * | 11/2007 | Yoshida ...................... 345/590 |
| 2002/0171868 | A1 | * | 11/2002 | Yoshimura et al. ......... 358/1.15 |
| 2004/0136020 | A1 |   | 7/2004  | Kumada |
| 2004/0236897 | A1 | * | 11/2004 | Cheng ........................ 711/103 |
| 2005/0210463 | A1 |   | 9/2005  | Abe |
| 2007/0225957 | A1 |   | 9/2007  | Ogura |

FOREIGN PATENT DOCUMENTS

| JP | 8-331287 A     | 12/1996 |
| JP | 9-319784 A     | 12/1997 |
| JP | 11-024546 A    | 1/1999  |
| JP | 2001-113803 A  | 4/2001  |
| JP | 2002-123383 A  | 4/2002  |
| WO | 2004/088989 A1 | 10/2004 |

OTHER PUBLICATIONS

Chinese Office Action dated Aug. 22, 2008.
Korean Office Action dated Dec. 12, 2007.

* cited by examiner

*Primary Examiner*—Hau H Nguyen
(74) *Attorney, Agent, or Firm*—Sughrue Mion, PLLC (57) ABSTRACT

An image formation processing simulation apparatus includes: a receiving unit that receives image data to which image formation processing is applied in an image formation processing device; a performing unit that performs simulation of image formation processing applied to the image data in the image formation processing device using the image data; a memory management unit that allocates a memory area for the image formation processing before the simulation, monitors the memory size required for the image formation processing in the simulation, and compares between the required memory size and the size of the allocated memory area; and an output unit that outputs information concerning the comparison result.

19 Claims, 8 Drawing Sheets

IMAGE FORMATION PROCESSING SIMULATION APPARATUS AND IMAGE FORMATION PROCESSING SIMULATION METHOD

CROSS-REFERENCE TO RELATED APPLICATION

This application claims priority under 35 USC 119 from Japanese Patent Application No. 2006-034534 filed on Feb. 10, 2006, the disclosure of which is incorporated by reference herein.

FIELD

The present invention relates to an image formation processing simulation apparatus and an image formation processing simulation method that provides information concerning the memory size required in image formation processing.

BACKGROUND

Hitherto, when a defective condition occurred in image formation processing (such as print processing) in an image formation processing device (such as a printer), for example, the user of the image formation processing device has caused the image formation processing device to simulate image formation processing or has transmitted information concerning the defective condition to the service center of the image formation processing device, thereby handling the defective condition.

However, the related arts described above deal with a defective condition occurring as a result of actually using the image formation processing device. Thus, for example, the user cannot previously check whether or not the size of memory installed in the image formation processing device is sufficient for performing print processing desired by the user without actually using the image formation processing device.

SUMMARY

An image formation processing simulation apparatus includes: a receiving unit that receives image data to which image formation processing is applied in an image formation processing device; a performing unit that performs simulation of image formation processing applied to the image data in the image formation processing device using the image data; a memory management unit that allocates a memory area for the image formation processing before the simulation, monitors the memory size required for the image formation processing in the simulation, and compares between the required memory size and the size of the allocated memory area; and an output unit that outputs information concerning the comparison result.

DETAILED DESCRIPTION

An image formation processing simulation system (which will be hereinafter referred to as "simulation system") including an image formation processing simulation apparatus (which will be hereinafter referred to as "simulation apparatus") according to one embodiment will be discussed. In the description of the embodiment, the case where a printer for performing print processing is used as an image formation processing device for performing image formation processing is taken as an example.

Figure 1:
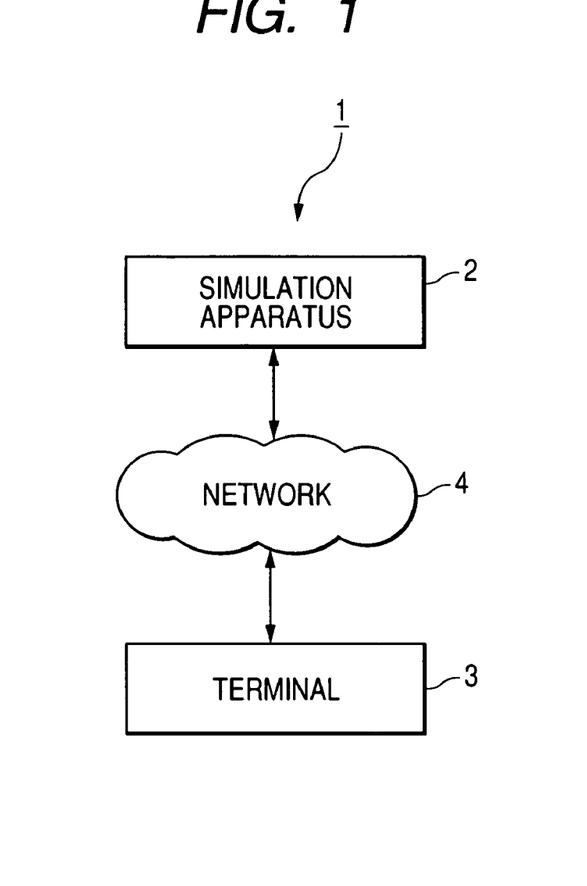
FIG. 1 is a schematic representation to show the main configuration of an image formation processing simulation system according to an embodiment.

FIG. 1 is a schematic representation to show the main configuration of a simulation system 1. As shown in FIG. 1, the simulation system 1 includes a simulation apparatus 2 and a terminal 3.

The simulation apparatus 2 and the terminal 3 are connected to a network 4 and can transmit and receive data to and from each other through the network 4. In the embodiment, the network is implemented as the Internet, the simulation apparatus 2 is implemented as a part of a Web server computer, and the terminal 3 is implemented as a personal computer owned by the user of the simulation system 1.

An outline of an example of simulation service provided by the simulation system 1 will be discussed. In the simulation system 1, first the user starts Web browser software installed in the terminal 3 and accesses a Web site provided by the simulation apparatus 2. When the Web site is accessed from the user, the simulation apparatus 2 displays an operation screen on a display of the terminal 3, requesting the user to enter set information, etc., required for performing of simulation. The user specifies the printer to be simulated according to a guide on the operation screen and transmits data to which print processing is applied to the simulation apparatus 2.

The simulation apparatus 2 performs simulation of print processing applied to the data received from the user in the printer specified by the user. Here, the simulation apparatus 2 checks whether or not a defective condition involved in the size of memory required for the print processing in the simulation, generates information for circumventing the defective condition, and transmits the check result and the information to the terminal 3.

Consequently, the user can acquire the information concerning the memory size, etc., required for any desired printer to rm print processing applied to any desired data before actually purchasing or using the printer.

Figure 2:
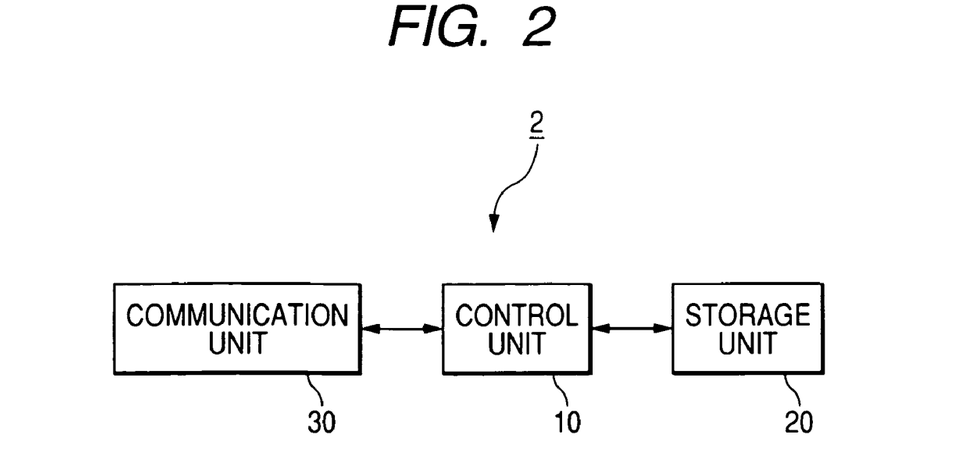
FIG. 2 is a block diagram to show the main configuration of an image formation processing simulation apparatus according to the embodiment.

FIG. 2 is a block diagram to show the main configuration of the simulation apparatus 2. As shown in FIG. 2, the simulation apparatus 2 has a control unit 10, a storage unit 20, and a communication unit 30.

The control unit 10 is implemented as a central processing unit (CPU), etc., and operates in accordance with a program (software) stored in the storage unit 20. The specific processing performed by the control unit 10 is described later in detail.

The storage unit 20 can be implemented as random access memory (RAM), read-only memory (ROM), a hard disk, etc. The storage unit 20 stores the programs executed by the control unit 10. It also operates as work memory for retaining data used in the processing performed by the control unit 10.

The communication unit 30 can be implemented as a network board, etc. The communication unit 30 is connected to the network 4 and receives data from the terminal 3 through the network 4 and outputs the received data to the control unit 10. The communication unit 30 transmits the data input from the control unit 10 through the network 4 to the terminal 3. The communication unit 30 can also be implemented as a serial port of a USB (universal serial bus), etc., a parallel port, etc., for example.

Figure 3:
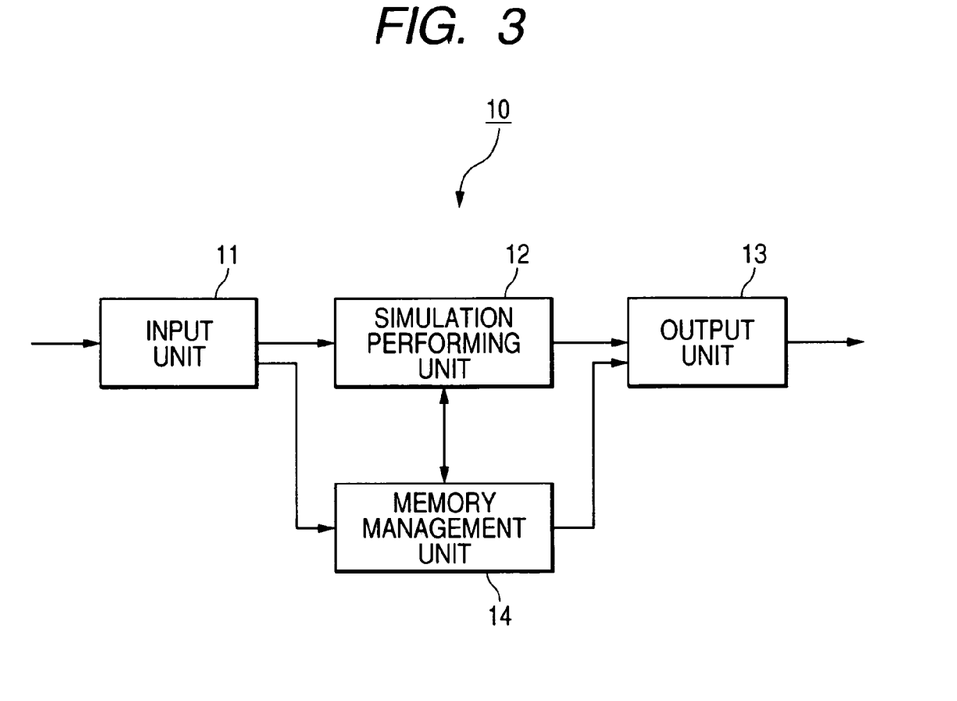
FIG. 3 is a functional block diagram to show the main processing performed by a control unit according to the embodiment.

Next, the processing performed by the control unit 10 will be discussed in detail. FIG. 3 is a functional block diagram to show the main processing performed by the control unit 10. As shown in FIG. 3, the control unit 10 functionally includes an input unit 11, a simulation performing unit 12, an output unit 13, and a memory management unit 14.

The input unit 11 receives printer selection information. This printer selection information is information for allowing the user to select a printer to be actually simulated (which will be hereinafter referred to as "target printer") from among printers that can be simulated in the simulation apparatus 2 (which will be hereinafter referred to as "candidate printer"). That is, the printer selection information is information to specify the type of target printer and contains the character strings, the numbers, etc., identifying the product name, the model identification information, the manufacturer, etc., of the, target printer, for example. The input unit 11 outputs the received printer selection information to the simulation performing unit 12.

Figure 4:
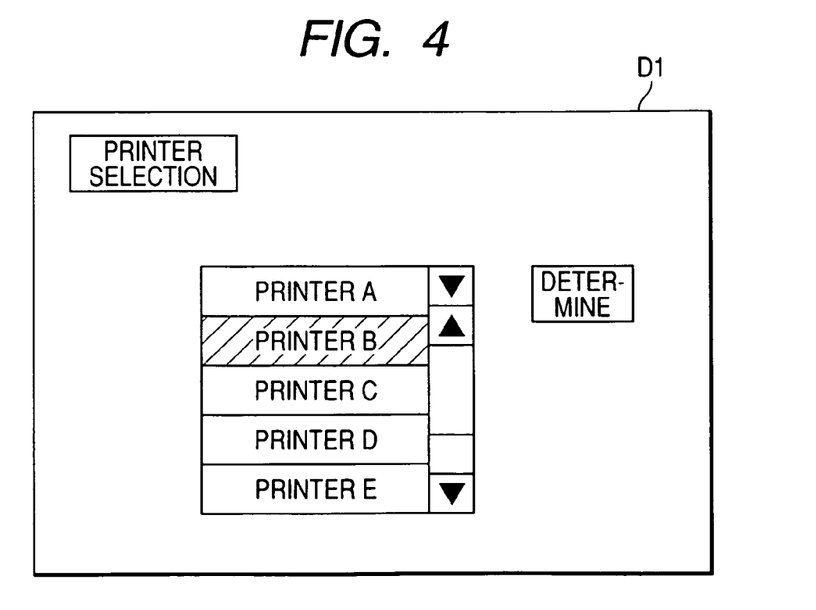
FIG. 4 is a schematic representation to show an example of an operation guide screen displayed by the control unit according to the embodiment.

The printer selection information is transmitted to the simulation apparatus 2 as the output unit 13 displays a screen D1 listing the product names of candidate printers ("printer A," "printer B," etc., shown in FIG. 4) on the display of the terminal 3 and the user performs input operation of selecting the printer to be purchased ("printer B" reverse-displayed in FIG. 4) from among the candidate printers, for example, as shown in FIG. 4.

Figure 5:
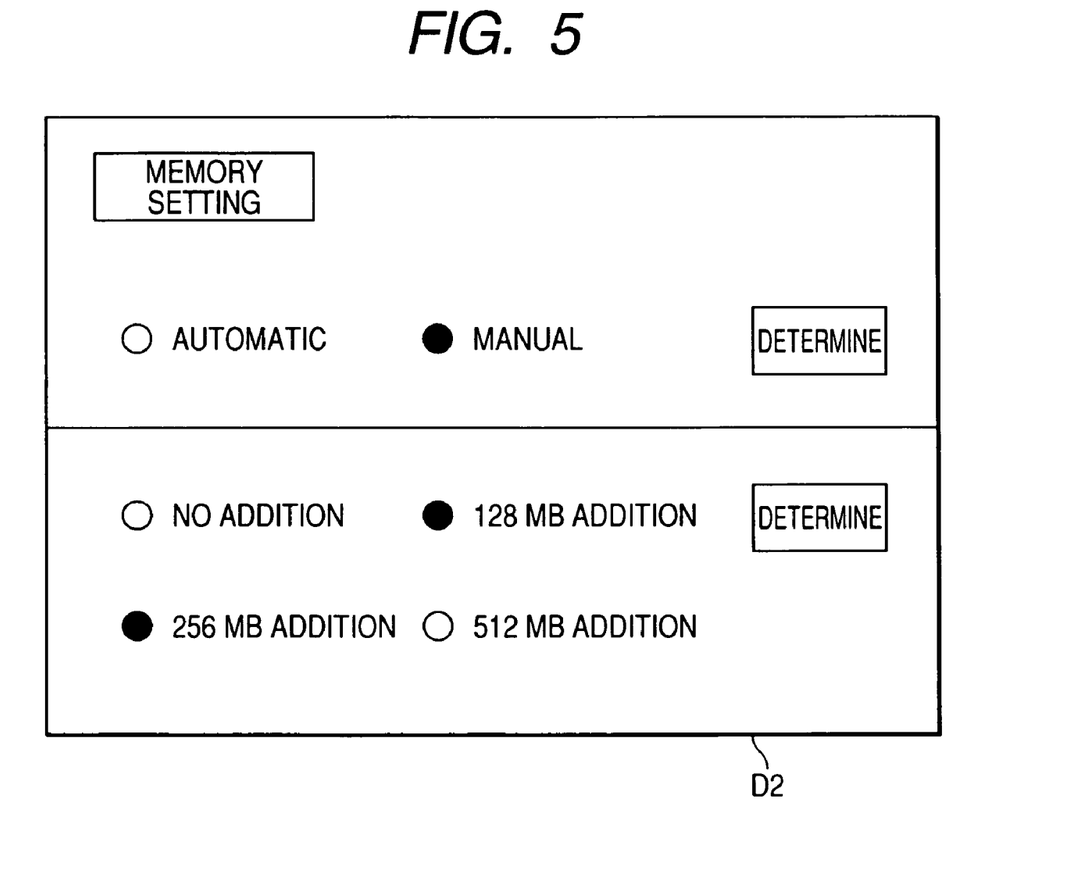
FIG. 5 is a schematic representation to show another example of an operation guide screen displayed by the control unit according to the embodiment.

The input unit 11 also receives memory set information. This memory set information is information to set the memory size available for print processing to be simulated (which will be hereinafter referred to as "set size"). That is, the memory set information contains information specifying the specific memory size entered by the user in the terminal 3, for example. That is, the output unit 13 displays a screen D2 on the display of the terminal 3, requesting the user to select either manual setting for specifying the specific memory size or automatic setting for setting a predetermined size to set the set size, for example, as shown in FIG. 5. If the user selects the manual setting, memory set information specifying the specific memory size selected by the user (for example, "128 MB (megabytes)," "256 MB," etc., shown in FIG. 5) is transmitted to the simulation apparatus 2. If the user selects the automatic setting, memory set information to the effect that the automatic setting is selected is transmitted to the simulation apparatus 2. The input unit 11 outputs the received memory set information to the memory management unit 14.

The input unit 11 also receives the data to which print processing is applied (which will be hereinafter referred to as "processing target data"). This processing target data is generated in a data format in which the data can be used for print processing executed by the target printer. That is, the processing target data is PDL data described in a predetermined page description language (PDL) that can be processed by the target printer, for example, and contains an image data portion representing an image (containing a text portion of character strings, etc., a pattern portion of a line drawing, etc., a photo portion, etc.,) to be formed on a predetermined medium (such as paper medium) and a header portion specifying the specifications and the quantity of the medium and print conditions of the layout of the image on the medium, etc. The input unit 11 outputs the received processing target data to the simulation performing unit 12.

The processing target data can be generated as a print job that can be processed by the target printer, for example, by converting image data generated using application software installed in the terminal 3 (text preparation software, graphics-drawing software, etc.,) into PDL data using printer driver software corresponding to the target printer, installed in the terminal 3. In this case, the user transmits the generated print job from the terminal 3 to the simulation apparatus 2.

The simulation performing unit 12 performs simulation processing simulating print processing applied to the processing target data in the target printer based on the printer selection information and the processing target data received from the input unit 11. That is, the simulation performing unit 12 first determines the printer identified by the printer selection information to be the target printer from among the candidate printers based on the printer selection information.

The storage unit 20 stores a printer information data table associating the printer identification information identifying each candidate printer and printer characteristic information representing the characteristics of print processing in the candidate printer with each other. Each piece of printer identification information is information identifying each candidate printer and contains the character strings, the numbers, etc., identifying the product name, the model identification information, the manufacturer, etc., of the target printer, for example. The printer characteristic information contains identification information specifying the program used in print processing by the candidate printer, information representing the output capability, etc., of a medium in the candidate printer, and the like and, for example, contains model and version information of firmware installed in the candidate printer, the ejection speed of paper media, etc.

Therefore, the simulation performing unit 12 compares between each piece of printer identification information contained in the printer information data table and the printer selection information received from the input unit 11 and determines the printer identified by the printer identification information corresponding to the printer selection information to be the target printer from among the candidate printers. The simulation performing unit 12 reads the printer characteristic information associated with the printer identification information corresponding to the target printer and performs simulation considering the output time of the medium in the target printer using the firmware specified by the printer characteristic information, for example.

The print processing to be simulated by the simulation performing unit 12 includes data analysis processing of analyzing the header portion and the image data portion of the processing target data and generating configuration data to be provided for bit map expansion, image drawing processing of rasterizing the configuration data and generating page data made of bit map data, and output processing of forming an image on the medium based on the page data and ejecting the medium. That is, the simulation performing unit 12 performs simulation of the data analysis processing, the image drawing processing, and the output processing applied to the processing target data using the firmware specified by the printer characteristic information based on the printer characteristic information of the target printer contained in the printer information data table.

The simulation performing unit 12 causes the output unit 13 to output the performing result of the simulation. That is, the simulation performing unit 12 instructs the output unit 13 to display the image based on the page data generated in the simulation on the display of the terminal 3.

The memory management unit 14 allocates a memory area of the set size involved in the memory set information received from the input unit 11 before the simulation performing unit 12 starts simulation. That is, if the memory set information specifying the memory size to be essentially installed in the target printer (which will be hereinafter referred to as "default size") according to manual setting of the user is received, for example, the memory management unit 14 sets the default size as the set size.

If the memory set information specifying the specific memory size to be added to the target printer according to manual setting of the user is received, for example, the memory management unit 14 sets the total memory size of the memory size to be added and the default size as the set size. In this case, for example, if the user specifies more than one memory size (for example, if the user specifies "128 MB addition" and "256 MB addition" as shown in FIG. 5), the set size is set as the memory size resulting from adding all of the memory sizes (for example, both of 128 MB and 256 MB) to the default size. For example, if the user selects the automatic setting, the memory management unit 14 sets the predetermined maximum memory size as the set size based on the memory set information to the effect that the automatic setting is selected.

After the simulation performing unit 12 starts to perform simulation, the memory management unit 14 monitors the memory size required for print processing during performing of the simulation. That is, the memory management unit 14 checks the memory size requested to be allocated to retain the data required in each step of the data analysis processing, the image drawing processing, the output processing, etc., in the print processing.

Specifically, when a request to allocate a new memory area (which will be hereinafter referred to as "memory allocation request") occurs in the print processing, for example, the memory management unit 14 checks the size of the memory area already used (namely, in which data is retained) at the point in time of occurrence of the memory allocation request (which will be hereinafter referred to as "used size") and the memory size requested to be allocated by the memory allocation request (which will be hereinafter referred to as "requested size").

When a request to release the memory area in which data is retained (which will be hereinafter referred to as "memory release request") occurs with erasion of the once retained data, for example, the memory management unit 14 checks the used size at the point in time of occurrence of the memory release request and the memory size requested to be released by the memory release request (which will be hereinafter referred to as "released size").

The memory management unit 14 compares between the memory size required for the print processing checked in the simulation and the preset size and outputs information concerning the comparison result to the output unit 13. That is, when a memory allocation request occurs, for example, the memory management unit 14 adds the requested size involved in the memory allocation request to the used size at the occurrence time of the memory allocation request, determines whether or not the memory size as the addition result is larger than the set size, and outputs the determination result to the output unit 13.

The memory management unit 14 records the maximum value of the memory size required for the print processing in the simulation (which will be hereinafter referred to as "maximum size"). That is, the memory management unit 14 records the maximum memory size of the memory sizes checked in the print processing and outputs the recorded maximum size to the output unit 13.

Specifically, when a memory allocation request occurs, for example, the memory management unit 14 adds the requested size involved in the memory allocation request to the used size at the occurrence time of the memory allocation request, and determines whether or not the memory size as the addition result exceeds the past maximum size recorded before occurrence of the memory allocation request. If the memory size as the addition result exceeds the maximum size, the memory management unit 14 records the memory size as the addition result as a new maximum size.

The memory management unit 14 also determines the memory size to be allocated for causing the actual target printer to perform print processing applied to the processing target data (which will be hereinafter referred to as "recommended size") based on the memory size required for the print processing in the simulation, and outputs information concerning the determination result to the output unit 13. That is, the memory management unit 14 determines the memory size larger than the memory sizes checked in the print processing to be the recommended size.

Specifically, after completion of the simulation, the memory management unit 14 determines whether or not the maximum size recorded in the simulation exceeds the default size of the target printer. If the maximum size exceeds the default size, the memory management unit 14 determines that a memory size larger than the difference between the maximum size and the default size (which will be hereinafter referred to as "insufficient size") is the memory size to be added to the target printer (which will be hereinafter referred to as "recommended addition size").

That is, if there are two or more memory sizes that can be added to the target printer, for example, the memory management unit 14 determines that the memory size of the memory sizes larger than and closest to the insufficient size is the recommended addition size. The memory management unit 14 may determine that the memory size resulting from adding the default size of the target printer and the insufficient size together is the recommended size.

The output unit 13 outputs the simulation result received from the simulation performing unit 12 and the information concerning the memory received from the memory management unit 14 to the terminal 3 through the communication unit 30. Consequently, the simulation result and the information concerning the memory are displayed on the display of the terminal 3.

The output unit 13 also notifies the user of requesting the user to enter information, data, etc, required for performing of the simulation. That is, the output unit 13 displays a user interface screen on the terminal 3, requesting the user to transmit the printer selection information, the memory set information, the processing target data, etc., to the simulation apparatus 2.

Figure 6:
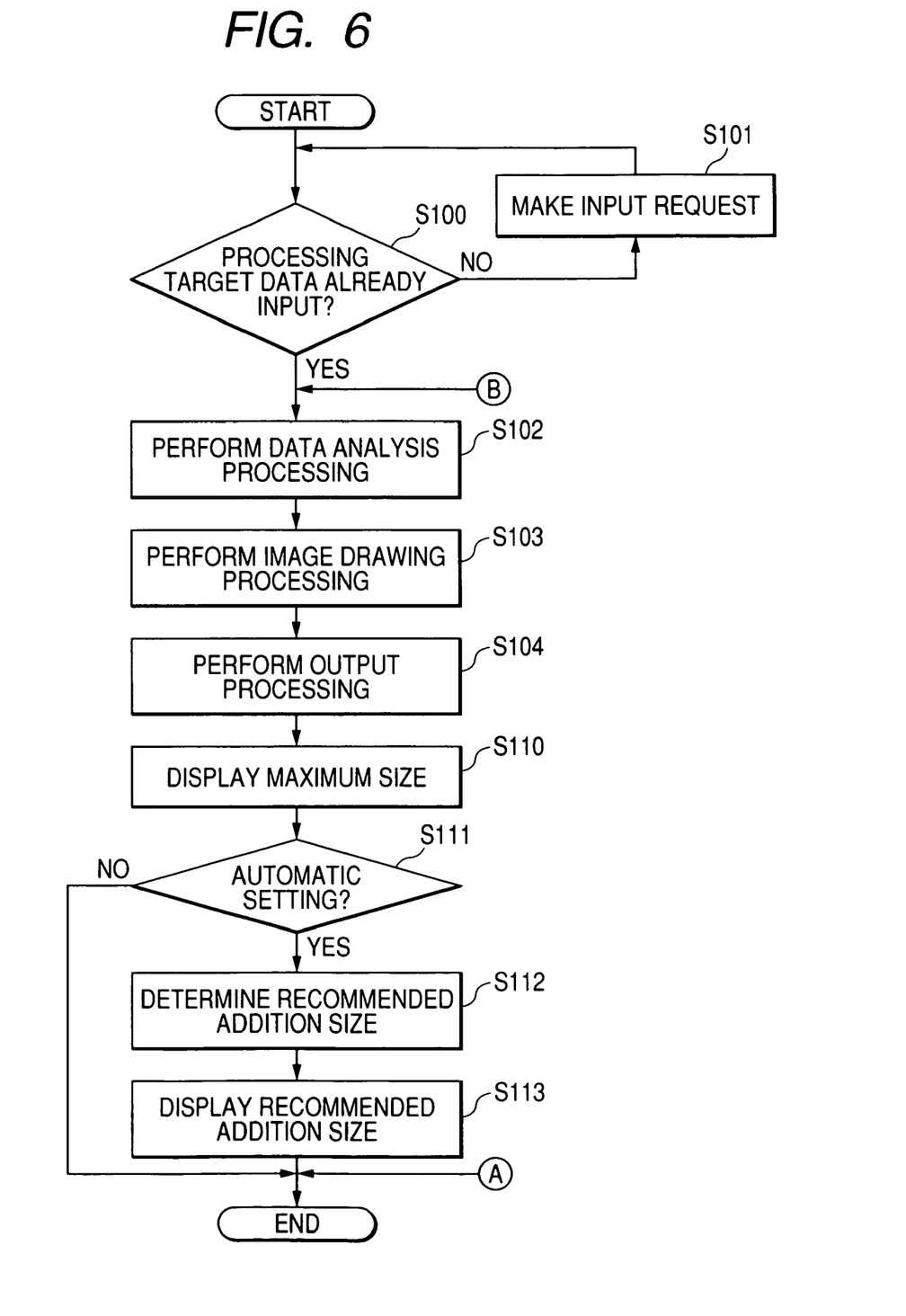
FIG. 6 is a flowchart to show an example of simulation processing performed by the control unit according to the embodiment.

Next, a flow of processing of the control unit 10 will be discussed. FIG. 6 is a flowchart to show the main flow of an example of simulation processing performed by the control unit 10. In the example, simulation of print processing of forming a first image and a second image on the first page and the second page of a paper medium will be discussed.

As shown in FIG. 6, when the input unit 11 inputs a command for performing simulation of print processing from the terminal 3, the input unit 11 determines whether or not processing target data to which the print processing is applied is already received (S100).

If processing target data is not yet received (NO at S100), the input unit 11 displays a screen for requesting the user to enter processing target data on the display of the terminal 3 (S101). If processing target data is already received and is retained (YES at S100), the input unit 11 outputs the processing target data to the simulation performing unit 12.

Upon reception of the processing target data from the input unit 11, the simulation performing unit 12 starts simulation of data analysis processing (S102). That is, the simulation performing unit 12 analyzes the processing target data and generates configuration data for each page. The simulation performing unit 12 starts simulation of image drawing processing in succession to the data analysis processing (S103). That is, the simulation performing unit 12 rasterizes the configuration data generated in the data analysis processing and generates page data of bit map data with a first image formed on the first page and a second image formed on the second page. The simulation performing unit 12 performs simulation of output processing for forming the images on the medium based on the page data generated in the image drawing processing (S104). That is, the simulation performing unit 12 outputs the generated page data to the output unit 13 and instructs the output unit 13 to display the images based on the page data on the display of the terminal 3.

The output unit 13 displays the first image to be formed on the first page and the second image to be formed on the second page on the display of the terminal 3 based on the page data received from the simulation performing unit 12 as the image to be formed on the paper medium, thereby presenting the images to the user.

The simulation performing unit 12 may perform simulation of the data analysis processing, the image drawing processing, and the output processing in order for different image portions. That is, for example, the simulation performing unit 12 may first perform simulation of the data analysis processing, the image drawing processing, and the output processing involved in the first image in order and then may start print processing involved in the second image at the data analysis processing. The simulation performing unit 12 may perform simulation of the data analysis processing, the image drawing processing, and the output processing concurrently for different image portions. That is, the simulation performing unit 12 may perform concurrently the image drawing processing of expanding the configuration data involved in the first image to bit map data and the data analysis processing involved in the second image after termination of the data analysis processing involved in the first image.

Figure 7:
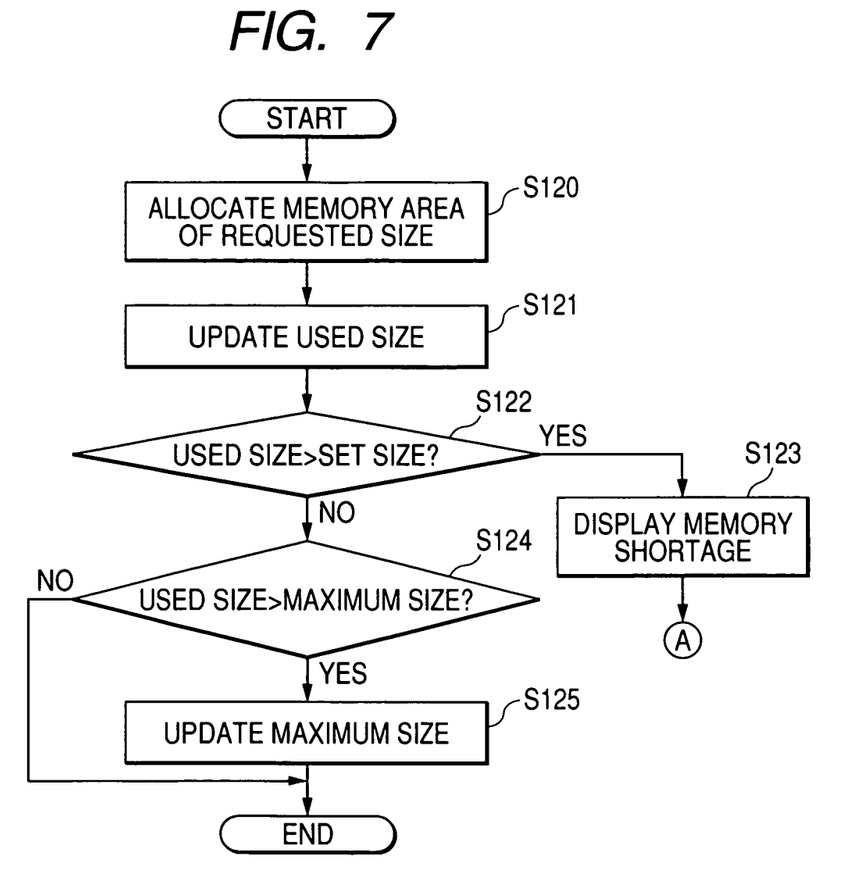
FIG. 7 is a flowchart to show an example of memory allocation processing performed by the control unit according to the embodiment.

The memory management unit 14 records and updates the used size and the maximum size in the simulation. FIG. 7 is a flowchart to show the main flow of an example of memory allocation processing performed by the memory management unit 14. As shown in FIG. 7, if a memory allocation request occurs in the data analysis processing, the image drawing processing, or the output processing, the memory management unit 14 first allocates a memory area of the requested size involved in the memory allocation request (S120).

The memory management unit 14 adds the requested size to the used size at the time of the memory allocation request and records the memory size as the addition result as a new used size, thereby updating the used size (S121).

Further, the memory management unit 14 determines whether or not the new used size exceeds the preset size (S122). If the used size exceeds the set size (YES at S122) the memory management unit 14 displays on the terminal 3 a message to the effect that as the memory size to be installed in the target printer, the set size is insufficient for the actual target printer to perform the print processing applied to the processing target data (S123). If the used size is equal to or less than the set size (NO at S122), the memory management unit 14 further determines whether or not the used size exceeds the maximum size before occurrence of the memory allocation request (S124).

If the used size exceeds the maximum size (YES at S124) the memory management unit 14 records the used size as a new maximum size, thereby updating the maximum size (S125) and terminates the processing. If the used size is equal to or less than the maximum size (NO at S124), the memory management unit 14 terminates the processing without updating the maximum size.

Figure 8:
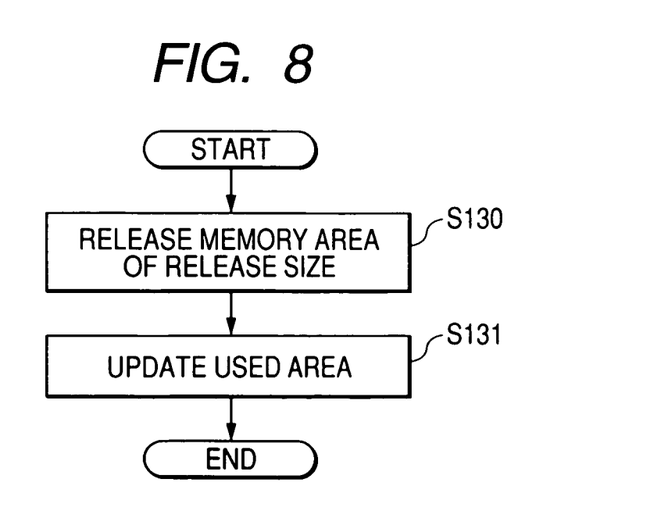
FIG. 8 is a flowchart to show an example of memory release processing performed by the control unit according to the embodiment.

FIG. 8 is a flowchart to show the main flow of an example of memory release processing performed by the memory management unit 14. As shown in FIG. 8, if a memory release request occurs in the data analysis processing, the image drawing processing, or the output processing, the memory management unit 14 first releases a memory area of the release size involved in the memory release request (S130).

The memory management unit 14 subtracts the release size from the used size at the time of the memory release request and records the memory size as the subtraction result as a new used size, thereby updating the used size (S131) and terminates the processing.

The memory release request occurs at the timing of erasing the page data with display of generated images in the output processing, at the timing of erasing the portion of the configuration data already expanded to bit map data in the image drawing processing, or at the timing of erasing the data retained for use in the print processing, for example.

Upon completion of the simulation, the memory management unit 14 displays the maximum size recorded in the simulation on the display of the terminal 3 (S110) as shown in FIG. 6. Further, the memory management unit 14 determines whether or not the set size is set according to the automatic setting (S111).

If the set size is set according to the manual setting rather than the automatic setting (NO at S111), the processing terminates. If the set size is set according to the automatic setting (YES at S111), the memory management unit 14 determines the recommended addition size exceeding the difference between the maximum size and the default size of the target printer based on the recorded maximum size (S112).

The memory management unit 14 displays the determined recommended addition size on the display of the terminal 3

(S113) and the processing terminates. If the maximum size does not exceed the set size, the memory management unit 14 may display a message to the effect that memory need not added to the target printer on the display of the terminal 3.

Thus, the control unit 10 receives the processing target data to which print processing is applied from the user and simulates print processing as to whether or not a defective condition of the memory size can occur if print processing of the processing target data is executed in the target printer specified by the user.

Therefore, the user can acquire the information concerning the memory size to be installed in the target printer before actually purchasing or using the target printer based on the simulation result.

The control unit 10 may delay the timing of memory release accompanying erasion of the page data by the time determined in response to the output performance of the target printer. That is, the memory management unit 14 determines the time required for outputting one or more paper media (which will be hereinafter referred to as "output time") based on the information specifying the specifications of paper media and the print mode (monochrome print mode, color print mode, etc.,) contained in the processing target data, the printer characteristic information representing the paper ejection speed, etc., of the target printer retained in the printer information data table, and the like, for example.

The memory management unit 14 waits without performing the memory release involved in the page data until the passage of the output time until output of the one-page image in the target printer after completion of generation of the one-page page data in the image drawing processing in simulation of the output processing. That is, the memory management unit 14 starts to measure the passage of the output time after generation of the page data and executes the memory release involved in the page data after the passage of the output time.

Figure 9:
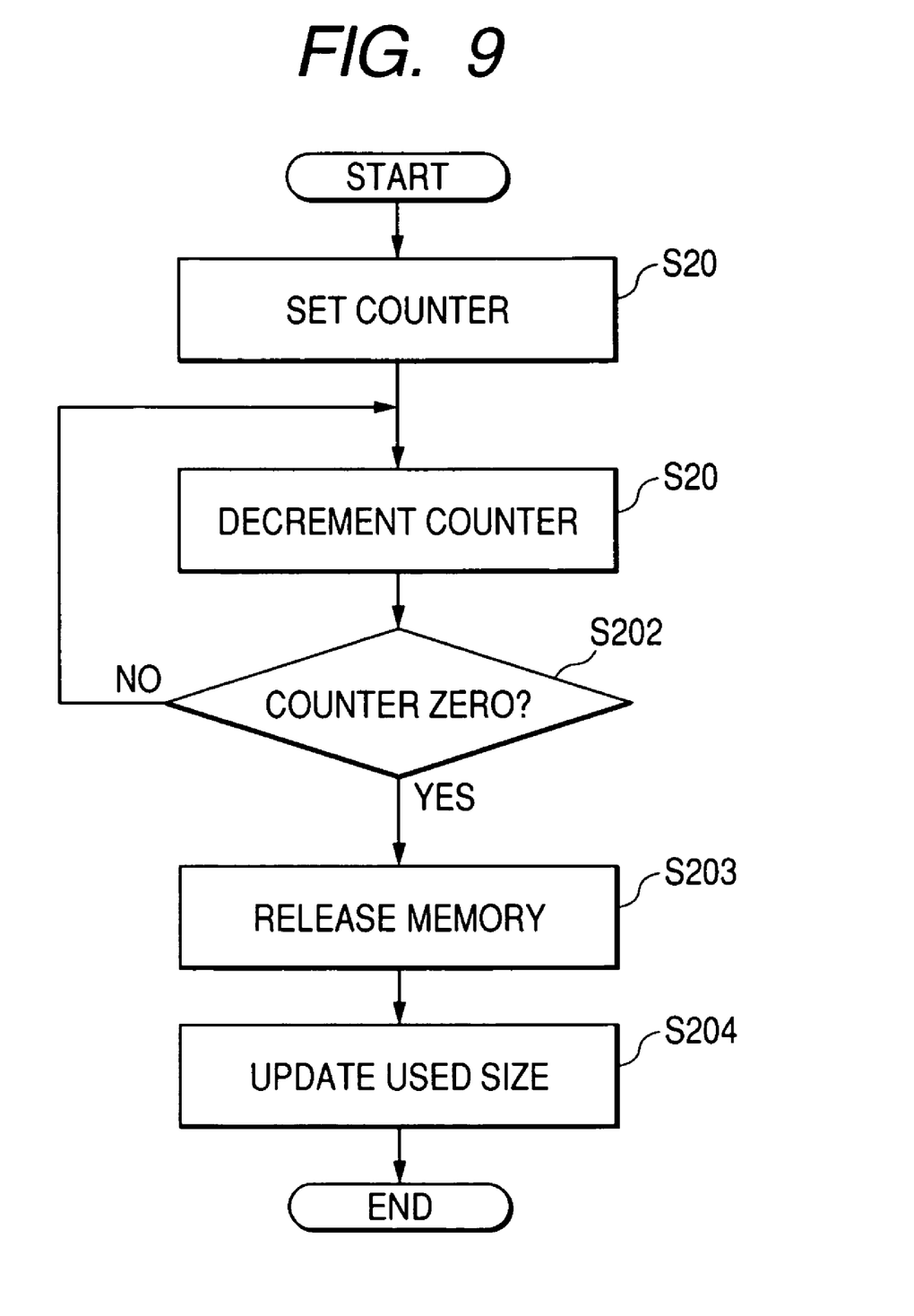
FIG. 9 is a flowchart to show another example of memory release processing performed by the control unit according to the embodiment.

FIG. 9 is a flowchart to show the main flow of an example of memory release processing performed by the memory management unit 14. As shown in FIG. 9, when page data is generated in the image drawing processing, for example, the memory management unit 14 sets the output time of the target printer in a counter (S200) and starts to decrement the counter (S201). Consequently, release of the memory area accompanying erasion of the page data enters a wait state.

Then, the memory management unit 14 determines whether or not the counter is set to zero (S202). If the counter is not zero (NO at S202), the memory management unit 14 continues counting down. If the counter is set to zero with the passage of the output time (YES at S202), the memory management unit 14 outputs the page data placed in the wait state to the output unit 13 for displaying the generated image on the display of the terminal 3, and releases the memory area retaining the page data (S203). Thus, the memory management unit 14 reproduces processing until the image is formed on a paper medium based on the page data and the paper medium is normally output after the page data is generated in the actual target printer as the wait state as long as the output time retained previously in association with the target printer.

The memory management unit 14 subtracts the released memory size from the used size recorded at the memory release time and records the memory size as the subtraction result as a new used size, thereby updating the used size (S204) and terminates the processing. The counter can be decremented using a timer (not shown), etc., included in the simulation apparatus 2.

Figure 10:
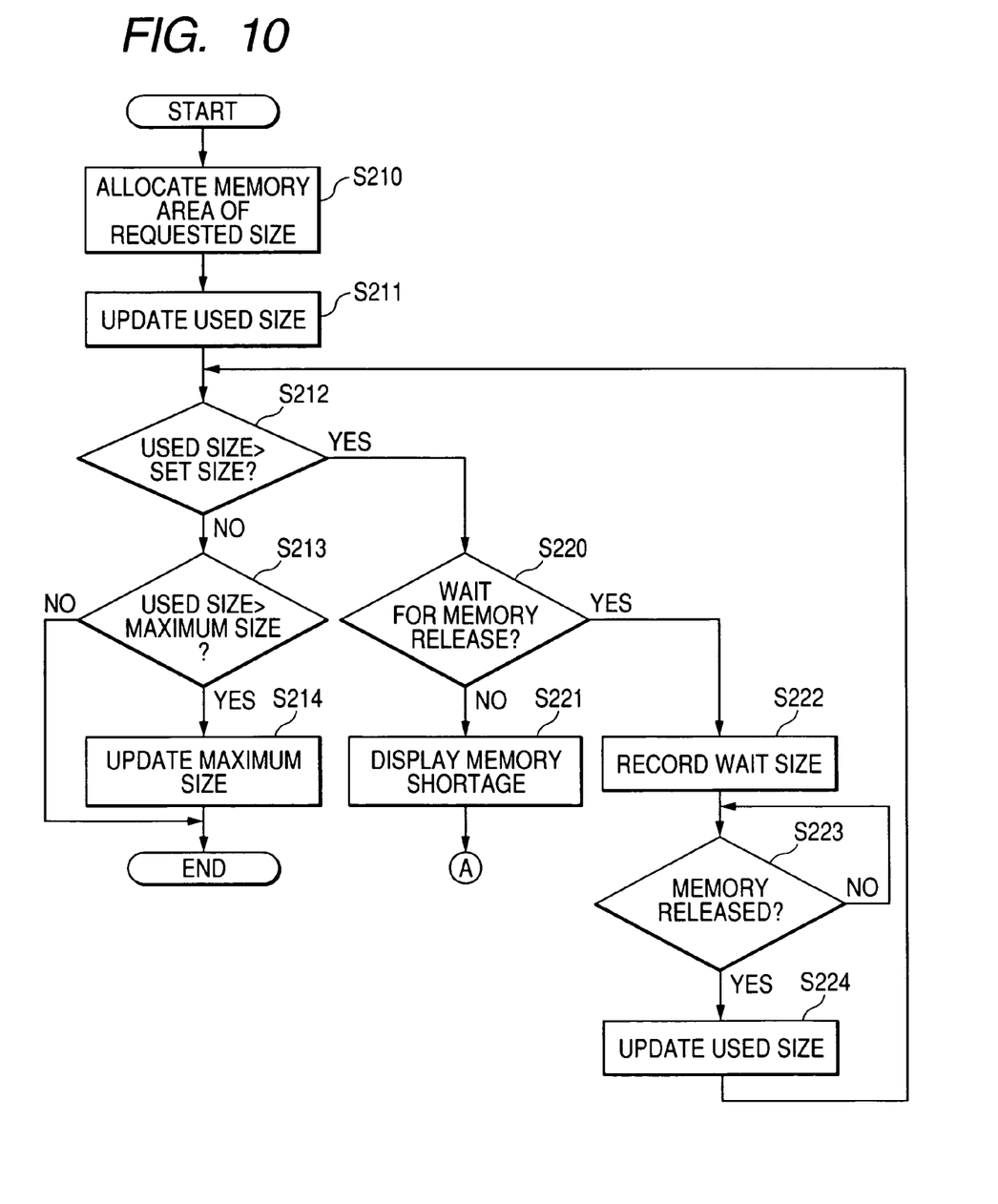
FIG. 10 is a flowchart to show another example of memory allocation processing performed by the control unit according to the embodiment.

FIG. 10 is a flowchart to show the main flow of an example of memory allocation processing performed by the memory management unit 14. As shown in FIG. 10, if a memory allocation request occurs in the data analysis processing, the image drawing processing, or the output processing, the memory management unit 14 first allocates a memory area of the requested size involved in the memory allocation request (S210).

The memory management unit 14 adds the requested size to the used size at the time of the memory allocation request and records the memory size as the addition result as a new used size, thereby updating the used size (S211).

For example, if memory release about the page data involved in one or more images is in a wait state at the occurrence time of the memory allocation request, the memory management unit 14 adds a new requested size to the used size at the time of the memory allocation request, namely, the used size containing the release size involved in the page data and records the memory size as the addition result as a new used size.

Further, the memory management unit 14 determines whether or not the new used size exceeds the preset size (S212). If the used size exceeds the set size (YES at S212) the memory management unit 14 determines whether or not memory release in a wait state exists (S220).

If there is no memory release in a wait state (NO at S220), the memory management unit 14 displays a message to the effect that memory shortage occurs on the terminal 3 (S221). If there is memory release in a wait state (YES at S220), the memory management unit 14 records the requested size involved in the memory allocation request as the memory size that cannot newly be allocated because the memory release is in a wait state (which will be hereinafter referred to as "wait size") (S222).

For example, when the memory management unit 14 records the wait size involved in the new memory allocation request, if there is at least one wait size already recorded in the simulation being executed, the memory management unit 14 may add the wait size involved in the memory allocation request to the already recorded wait size and may record the memory size as the addition result as a new wait size, thereby updating the wait size. In this case, the total of the requested sizes made to wait for memory release because of occurrence of wait state in the simulation is recorded as the wait size.

The memory management unit 14 may record the maximum wait size of the wait sizes recorded in the simulation, for example. The memory management unit 14 may record the used size determined to exceed the set size at step S212, namely, the used size containing the release size in a wait state and the new requested size as an enlarged used size. In this case, the memory management unit 14 may record the maximum enlarged used size of the enlarged used sizes recorded in the simulation.

The memory management unit 14 references the counter and determines whether or not the memory release in a wait state has been executed (S223). If the memory release is not yet executed (NO at S223), the memory management unit 14 stands by and continues to monitor the counter. If the memory release has been executed with the passage of the output time (YES at S223), the memory management unit 14 subtracts the released size involved in the memory release from the used size and records the memory size as the subtraction result as a new used size, thereby updating the used size (S224) and determines whether or not the new used size exceeds the set size (S212).

If the used size is equal to or less than the set size (NO at S212), the memory management unit 14 further determines whether or not the used size exceeds the maximum size recorded at the time of the memory allocation request (S213).

If the used size exceeds the maximum size (YES at S213), the memory management unit 14 records the used size as a new maximum size, thereby updating the maximum size (S214) and terminates the processing. If the used size is equal to or less than the maximum size (NO at S213), the memory management unit 14 terminates the processing without updating the maximum size.

In this case, the maximum size presented to the user by the memory management unit 14 (S110 in FIG. 6) becomes the memory size required for performing of allocation of the memory area involved in new memory allocation request without any delay if wait for memory release responsive to the output performance of the target printer occurs.

The memory management unit 14 determines the recommended addition size based on least one of the maximum size, the wait size, or the enlarged used size recorded in the simulation. That is, for example, the memory management unit 14 determines the recommended addition size exceeding the difference between the maximum size, the memory size resulting from adding the wait size to the maximum size, or the enlarged used size and the default size of the target printer, and displays the recommended addition size on the display of the terminal 3 (S113 in FIG. 6).

Thus, if the memory release wait and memory allocation request timing overlap, the memory management unit 14 can present to the user the memory size required for advancing processing without stopping processing involved in the memory allocation request, namely, the memory size required for performing print processing without degrading the performance of the target printer regardless of whether or not wait for memory releases exists.

The control unit 10 may previously allocate different memory areas as memory areas for retaining data which needs to be retained for print processing in simulation and may retain data of a predetermined specific type (which will be hereinafter referred to as "specific data") and data other than the specific data (which will be hereinafter referred to as "non-specific data") in the different memory areas.

That is, the memory management unit 14 selectively retains the specific data in the memory area capable of retaining data if power is not supplied, for example. Specifically, for example, the memory management unit 14 retains the specific data on a hard disk, a compact disk, etc., for magnetically or optically recording data and retains non-specific data in a semiconductor memory device such as RAM for electrically recording data.

The specific data is data that can be read in different print processing later executed for repetitive use as the data is once retained, for example. Specifically, the specific data is font data, form data, etc., that can be downloaded through the network 4, for example.

Figure 11:
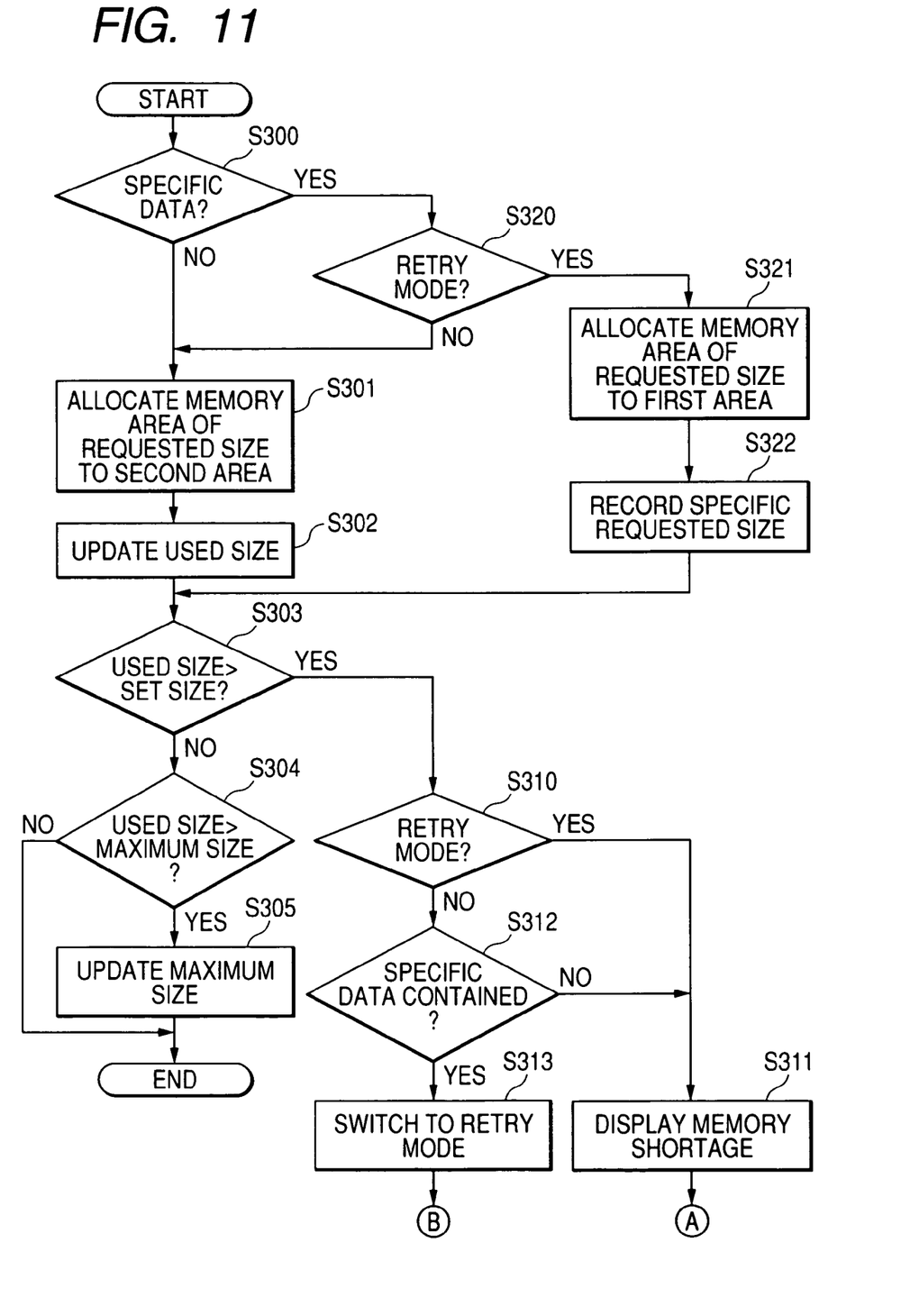
FIG. 11 is a flowchart to show still another example of memory allocation processing performed by the control unit according to the embodiment.

FIG. 11 is a flowchart to show the main flow of an example of memory allocation processing performed by the memory management unit 14. In the example, the mode of performing processing of separately retaining specific data and non-specific data in different memory areas separately allocated is referred to as "retry mode." In the retry mode, the memory management unit 14 retains the specific data in a first area allocated on a hard disk and retains the non-specific data in a second area allocated in RAM.

As shown in FIG. 11, if a memory allocation request occurs in the data analysis processing, the image drawing processing, or the output processing, the memory management unit 14 first determines whether or not the memory allocation request is a memory allocation request for retaining specific data (S300). If the memory allocation request concerns specific data, the memory management unit 14 further determines whether or not processing is performed in the retry mode (S320).

If processing is not performed in the retry mode (NO at S320) or if the memory allocation request does not concern specific data (NO at S300), the memory management unit 14 allocates a memory area of the requested size involved in the memory allocation request to the second area. Further, the memory management unit 14 adds the requested size to the used size at the time of the memory allocation request and records the memory size as the addition result as a new used size, thereby updating the used size (S302).

The memory management unit 14 determines whether or not the new used size exceeds the set size (S303). If the used size exceeds the set size (YES at S303), the memory management unit 14 determines whether or not processing is performed in the retry mode (S310). If processing is performed in the retry mode (YES at S310), the memory management unit 14 displays a message indicating memory shortage on the terminal 3; if processing is not performed in the retry mode (NO at S310), the memory management unit 14 further determines whether or not specific data is retained in the second area at the time of the memory allocation request, namely, the data retained in the second area contains specific data (S312).

If the retained data does not contain specific data (NO at S312), the memory management unit 14 displays a message indicating memory shortage on the terminal 3 (S311); if the retained data contains specific data (YES at S312), the memory management unit 14 switches the processing to the retry mode and instructs the simulation performing unit 12 to again perform simulation from the beginning.

If a memory allocation request involved in specific data occurs in the simulation restarted in the retry mode (YES at S320), the memory management unit 14 allocates a memory area of the requested size involved in the memory allocation request, namely, a memory area for the specific data to the first area (S321). Further, the memory management unit 14 records the requested size involved in the specific data (which will be hereinafter referred to as "specific requested size") (S322).

For example, when the memory management unit 14 records the specific requested size involved in the new memory allocation request, if there is at least one specific requested size already recorded in the simulation being executed, the memory management unit 14 adds the specific requested size involved in the memory allocation request to the already recorded specific requested size and records the memory size as the addition result as a new specific requested size, thereby updating the specific requested size.

If the memory allocation request occurring in the retry mode does not concern specific data (NO at S300), the memory management unit 14 allocates a memory area of the requested size involved in the memory allocation request to the second area (S301).

The memory management unit 14 adds the requested size involved in new memory allocation request to the used size at the time of the memory allocation request (namely, the memory size of the second area in which data is retained) and records the memory size as the addition result as a new used size, thereby updating the used size (S302).

Further, the memory management unit 14 determines whether or not the used size exceeds the set size (S303). If the used size exceeds the set size (YES at S303), the memory management unit 14 goes to step S310 described above. If the used size is equal to or less than the set size (NO at S303), the memory management unit 14 determines whether or not the used size exceeds the maximum size recorded at the occurrence time of the memory allocation request (namely, the maximum memory size of the used sizes checked in the simulation) (S304).

If the used size exceeds the maximum size (YES at S304) the memory management unit 14 records the used size as a new maximum size, thereby updating the maximum size (S305) and terminates the processing. If the used size is equal to or less than the maximum size (NO at S304), the memory management unit 14 terminates the processing without updating the maximum size.

In this case, the memory management unit 14 determines the recommended addition size based on the maximum size and the recommended addition size based on the specific requested size in recommended addition size determination processing (S112 in FIG. 6). That is, for example, the memory management unit 14 displays the memory size of hard disk that can be added to the target printer, the memory size exceeding the specific requested size on the display of the terminal 3 as the memory size of hard disk to be added to the target printer (S113 in FIG. 6).

The invention is not limited to the examples described above. That is, for example, the processing target data received by the input unit 11 is not limited to the data generated in the terminal 3 and may be data generated in any other computer, etc. For example, the input unit 11 may receive application data containing image data generated using application software in the terminal 3, any other computer, or the like. In this case, the storage unit 20 retains the application software used to generate the application data and the printer driver software corresponding to the target printer. The input unit 11 starts the printer driver software and converts the received application data into processing target data of PDL data, etc., that can be processed by the target printer, and the simulation performing unit 12 performs simulation of print processing applied to the generated processing target data.

The timing at which the memory management unit 14 checks the memory size required for print processing in simulation is not limited to the occurrence time of a memory allocation request or the occurrence time of a memory release request; for example, it may be a periodical timing at predetermined time intervals or may be a timing conforming to a predetermined schedule. The output unit 13 may transmit the simulation result and the information concerning the memory size to the terminal 3 by electronic mail, etc., for example.

The number of the terminals 3 that can access the simulation apparatus 2 is not limited to one, and the simulation apparatus 2 can perform simulation in response to requests from a plurality of computers, etc., connected to the network 4. The network 4 is not limited to the Internet and can also be implemented as a local area network (LAN), etc., for example. The terminal 3 can also be implemented as a mobile terminal such as a mobile telephone or a PDA (Personal Digital Assistant). The image formation processing device may be any if it executes image formation processing based on input data; for example, a facsimile machine, a copier, a scanner for optically reading an image formed on a medium, etc., can also be used.

What is claimed is:

1. An image formation processing simulation apparatus comprising:
    a receiving unit that receives image data to be processed by an image formation processing device;
    a performing unit that simulates processing the image data in the image formation processing device;
    a memory management unit that allocates a memory area for simulating the processing performed by the performing unit based on a memory size of the image formation processing device, monitors an amount of memory required for simulating the processing, and compares the amount of memory required for simulating the processing to the size of the allocated memory area; and
    an output unit that outputs information indicating whether the amount of memory required for simulating the processing exceeds the size of the allocated memory area,
    wherein the performing unit simulates processing the image data in the image formation processing device as if the image data was being processed by the image formation processing device, and
    wherein the output unit outputs a result of the processing simulated by the performing unit to a display.

2. The image formation processing simulation apparatus according to claim 1, wherein the memory management unit determines a memory size required by the image formation processing device to process the image data based on the memory size required for simulating the processing of the image data, and
    wherein the output unit outputs the memory size required by the image formation processing device to process the image data.

3. The image formation processing simulation apparatus according to claim 1, wherein the memory management unit records a maximum value of the amount of memory required for simulating the processing of the image data, and
    wherein the output unit outputs the maximum value of the amount of memory required for simulating the processing of the image data.

4. The image formation processing simulation apparatus according to claim 1, further comprising:
    a storage unit that stores printer information data about a plurality of image formation processing devices, the plurality of image formation processing devices including the image formation processing device.

5. The image formation processing simulation apparatus according to claim 4, wherein the printer information about the image formation processing device is a firmware of the image formation processing device, and
    wherein the processing the image data simulated by the performing unit uses the firmware of the image formation processing apparatus to simulate the processing.

6. The image formation processing simulation apparatus according to claim 4, wherein the processing the image data simulated by the performing unit comprises:
    analyzing the image data based on printer information about the image formation processing device stored in the storage unit.

7. The image formation processing simulation apparatus according to claim 6, wherein the output unit outputs the analyzed image data to a display.

8. The image formation processing simulation apparatus according to claim 1, wherein processing the image data comprises:
    selecting the image formation processing device as a device to be simulated from the image data;
    obtaining printer characteristic information for the image formation processing device, the printer characteristic information including a firmware of the image formation processing device and a program used by the image formation processing device for processing the image data; and
    executing the program according to the firmware.

9. The image formation processing simulation apparatus according to claim 1, wherein processing the image data comprises:
    data analysis processing of the image data;

image drawing processing of the image data; and output processing of the image data.

10. The image formation processing simulation apparatus according to claim 9, wherein the data analysis processing comprises analyzing a header portion and an image data portion of the image data and generating configuration data for bit map expansion, the image drawing processing comprises rasterizing the configuration data and generating page data based on the bit map data, and the output processing comprises forming an image on a medium based on page data of the medium and ejecting the medium.

11. The image formation processing simulation apparatus according to claim 1, wherein processing the image data comprises at least one of:

data analysis processing of the image data, the data analysis processing comprising analyzing a header portion and an image data portion of the image data and generating configuration data for bit map expansion;

image drawing processing of the image, the image drawing processing comprising rasterizing configuration data and generating page data based bit map data; and output processing of the image data, the output processing comprising forming an image on a medium based on page data of the medium and ejecting the medium.

12. The image formation processing simulation apparatus according to claim 11, wherein the image data portion comprises at least one of a text portion of character strings, a line drawing, and a photo to be formed on a medium and the header portion comprises a quantity of a medium and a print condition of a layout of an image to be formed on the medium.

13. The image formation processing simulation apparatus according to claim 1, wherein the performing unit virtually simulates processing the image data in the image formation processing device without processing the image data in the image forming device.

14. An image formation processing simulation method comprising:

receiving image data to be processed by an image formation processing device;

simulating processing the image data in the image formation processing device;

allocating a memory area for simulating the processing based on a memory size of the image information processing device;

monitoring an amount of memory required for simulating the processing;

comparing the amount of memory required for simulating the processing to the size of the allocated memory area; and outputting information indicating whether the amount of memory required for simulating the processing exceeds the size of the allocated memory area to a display, wherein the simulating comprises simulating processing the image data in the image formation processing device as if the image data was being processed by the image formation processing device, and wherein the outputting comprises outputting a result of the simulated processing to the display.

15. The image formation processing simulation method according to claim 14, further comprising:

storing printer information data about a plurality of image formation processing devices, the plurality of image formation processing devices including the image formation processing device.

16. The image formation processing simulation method according to claim 15, wherein the printer information about the image formation processing device is a firmware of the image formation processing device, and wherein the simulating uses the firmware of the image formation processing apparatus to simulate the processing.

17. The image formation processing simulation method according to claim 15, wherein the processing comprises:

analyzing the image data based on the stored printer information about the image formation processing device.

18. The image formation processing simulation method according to claim 17, wherein the outputting comprises outputting the analyzed image data to the display.

19. The image formation processing simulation method according to claim 14, further comprising:

determining a memory size required by the image formation processing device to process the image data based on the memory size required for simulating the processing of the image data, wherein the outputting comprises outputting the memory size required by the image formation processing device to process the image data.

* * * * *